United States Patent

Miles et al.

(10) Patent No.: US 7,646,201 B2
(45) Date of Patent: Jan. 12, 2010

(54) AIRBORNE ELECTROMAGNETIC (EM) SURVEY SYSTEM

(75) Inventors: Philip J. Miles, Oakville (CA); Jason Berringer, Rockwood (CA); David G. Hodges, Mississauga (CA); Peter A. Wolfgram, Rivervale (AU)

(73) Assignee: Fugro Airborne Surveys Crop., Mississauga (CA)

( * ) Notice: Subject to any disclaimer, the term of this patent is extended or adjusted under 35 U.S.C. 154(b) by 98 days.

(21) Appl. No.: 12/098,062

(22) Filed: Apr. 4, 2008

(65) Prior Publication Data

US 2008/0246484 A1 Oct. 9, 2008

(30) Foreign Application Priority Data

Apr. 5, 2007 (CA) .................................. 2584037

(51) Int. Cl.
*G01V 3/16* (2006.01)
*G01V 3/165* (2006.01)

(52) U.S. Cl. ........................ 324/330; 324/331; 343/705

(58) Field of Classification Search ......... 324/330–331; 343/705

See application file for complete search history.

(56) References Cited

FOREIGN PATENT DOCUMENTS

WO 2004046761 3/2004

*Primary Examiner*—Reena Aurora
(74) *Attorney, Agent, or Firm*—Daniel J. Chalker; Edwin S. Flores; Chalker Flores, LLP

(57) ABSTRACT

An airborne electromagnetic survey system for conducting geological mapping is disclosed. A transmitter closed loop structure is used in the system and is designed for connection to a towing airborne vehicle. The transmitter loop structure comprises a plurality of interconnected loop segments, and transmitting means are fitted to at least one of the loop segments for generating and transmitting an earthbound primary electromagnetic field effective for geological surveying. Sensing means are fitted to the loop segments for receiving and sensing a vertical component of a secondary resulting electromagnetic field which arises from an interaction of the primary electromagnetic field with ground bodies that are traversed by the sensing means, while simultaneously nulling the primary electromagnetic field. Helical sensing means are positioned in close proximity to the transmitting means to receive and sense a horizontal electromagnetic field contained in the secondary resulting field, while simultaneously nulling the primary electromagnetic field.

34 Claims, 2 Drawing Sheets

AIRBORNE ELECTROMAGNETIC (EM) SURVEY SYSTEM

TECHNICAL FIELD OF THE INVENTION

The present invention relates to an airborne time-domain electromagnetic survey system for conducting geological mapping.

PRIORITY CLAIM TO RELATED APPLICATIONS

The application claims priority to Canadian Application Serial No. 2,584,037, filed Apr. 5, 2007, the entire contents of which are incorporated herein by reference.

BACKGROUND OF THE INVENTION

The advantage of airborne electromagnetic surveying systems is that a greater amount of surface area can be covered when conducting geological surveying for mineral exploration. In conducting airborne electromagnetic surveying, usually an airborne vehicle is fitted with a transmitter, which can be mounted on or towed by the airborne vehicle, such as a helicopter, airplane or other aircraft, for emitting a primary electromagnetic field for surveying terrain over which the airborne vehicle is flying. A receiver then receives and records a resultant field, corresponding to the interaction of the primary field with the underlying terrain, and which comprises a combination of the primary electromagnetic field emitted by the transmitter as well as a secondary field emanating from the underlying terrain. This secondary field may then be processed, after it is received, in order to ascertain the nature and geological composition of the underlying terrain.

Because the secondary field emanating from the underlying terrain is generally much smaller in amplitude than the primary electromagnetic field, the primary electromagnetic field can overwhelm the receiver and interfere with its ability to sense the secondary field. Further, such transmitted electromagnetic fields generally generate eddy currents not only in the Earth but also in the proximate metallic parts including those of the system itself and the aircraft body. The secondary fields of these eddy currents constitute noise, which can adversely impact the survey data and generally increase the difficulty in obtaining reliable geological information from this data.

One of the most common ways to minimize this noise is by isolating the receiver as much as possible from the primary electromagnetic field emitted by the transmitter. Previously, such isolation was achieved by physically separating the receiver from the transmitter by as great a distance as possible. In general, the greater the distance between the receiver and the transmitter, the smaller the amplitude of the primary electromagnetic field at the receiver, and, accordingly, the lesser the interference with the receiver in detecting the secondary field.

Typically such distances are maintained between the receiver and the transmitter, by causing the receiver to be housed in a "bird" towed by the airborne vehicle.

However, separating the transmitter and receiver by housing the receiver in a bird leads to technical problems, with the receiver changing position relative to the transmitter, and detecting much of the primary field from the transmitter.

Another common means is to devise a transmitter loop structure containing the transmitter, to which is attached the separate receiver, in a rigid position as far away from the transmitter as possible, so as to maintain the distance therebetween as far as possible and the geometry therebetween as constant as possible.

However, there are a number of technical problems in designing such systems. First, such systems are generally larger and demand heavier frame constructions for carrying the transmitter and receiver. For example, due to the separation required between the transmitter and the receiver in the bird, it is not unusual for such devices to exceed 20 feet in length and up to several hundred pounds in weight. While such frames provide a certain amount of rigidity, which can provide less noise at the receiver, the heavier frame makes transportation of the bird difficult. The production costs and fuel costs associated with the manufacturing and use thereof can also be high.

In attempting to alleviate this problem, some prior art systems, such as that described in International Patent Publication No. WO 2004/046761 (Morrison et al, have utilized light weight support frame constructions, but these have tended to be overly flexible, as opposed to utilizing a rigid structure, and are thus susceptible to noise, through vibration during use.

It would therefore be advantageous to have a rigid transmitter loop structure for use in an airborne electromagnetic (EM) surveying system which maximizes the rigidity of the structure, so as to reduce vibratory noise, while, at the same time, minimizing the size and weight thereof.

It would be further advantageous to have an electromagnetic (EM) survey system that is capable of substantially completely cancelling the primary electromagnetic field signal emitted by the transmitter, while still measuring vertical and/or horizontal components of the resulting electromagnetic field.

SUMMARY OF THE INVENTION

The present invention provides an improved rigid transmitter loop structure for use in an airborne electromagnetic (EM) surveying system, and having a compact design which maximizes the rigidity of the structure, so as to reduce noise, while, at the same time, minimizing the size and weight thereof.

The present invention provides an improved rigid transmitter loop structure which utilizes dual turn receiver coils to null out the primary electromagnetic field signal emitted by the transmitter, while still measuring a vertical component of the secondary electromagnetic field, and utilizes helical coils, in close proximity to the transmitter, oriented and connected to null out the primary electromagnetic field signal emitted by the transmitter, while still measuring a horizontal component of the secondary electromagnetic field.

According to a first broad aspect of an embodiment of the present invention, there is disclosed a rigid transmitter loop structure for use in an airborne electromagnetic surveying system and designed for connection to a towing airborne vehicle, the transmitter loop structure comprising a plurality of interconnected loop segments adapted to be constructed to form a rigid closed loop; transmitting means fitted to at least one of the interconnected loop segments for generating and transmitting an earthbound primary electromagnetic field effective for geological surveying; sensing means fitted to at least one of the interconnected loop segments for receiving and sensing a vertical component of a secondary resulting electromagnetic field, the secondary resulting field arising from an interaction of the primary electromagnetic field with ground bodies that are traversed by the sensing means, while simultaneously nulling the primary electromagnetic field; and helical sensing means positioned in close proximity to the transmitting means, for receiving and sensing a horizontal electromagnetic field contained in the secondary resulting field, while simultaneously nulling the primary electromagnetic field.

According to a second broad aspect of an embodiment of the present invention, there is disclosed a rigid transmitter loop structure for use in an airborne electromagnetic surveying system and designed for connection to a towing airborne vehicle, the transmitter loop structure comprising a plurality of interconnected loop segments adapted to be constructed to form a rigid closed loop, each of the interconnected loop segments comprising a center portion, a first container connected to an outside surface of the center portion, a second container connected to an inside surface of the center portion, and a pair of flange plates, the flange plates each being secured to respective end portions of the center portion and the first and the second container; transmitting means fitted to at least one of the interconnected loop segments for generating and transmitting an earthbound primary electromagnetic field effective for geological surveying; sensing means fitted to at least one of the interconnected loop segments for receiving and sensing a vertical component of a secondary resulting electromagnetic field, the secondary resulting field arising from an interaction of the primary electromagnetic field with ground bodies that are traversed by the sensing means, while simultaneously nulling the primary electromagnetic field; and helical sensing means positioned in close proximity to the transmitting means, for receiving and sensing a horizontal electromagnetic field contained in the secondary resulting field, while simultaneously nulling the primary electromagnetic field.

According to a third broad aspect of an embodiment of the present invention, there is disclosed an airborne electromagnetic survey system for attachment to a towing airborne vehicle, the system comprising a transmitter loop structure, the loop structure comprising a plurality of interconnected loop segments adapted to be constructed to form a rigid closed loop, each having a center portion, a first container connected to an outside surface of the center portion, a second container connected to an inside surface of the center portion, and a pair of flange plates, the flange plates each being secured to respective end portions of the center portion and the first and the second container; transmitting means fitted to at least one of the interconnected loop segments for generating and transmitting an earthbound primary electromagnetic field effective for geological surveying; sensing means fitted to the interconnected loop segments for receiving and sensing a vertical component of a secondary resulting electromagnetic field, the secondary resulting field arising from an interaction of the primary electromagnetic field with ground bodies that are traversed by the sensing means, while simultaneously nulling the primary electromagnetic field; and helical sensing means positioned in close proximity to the transmitting means, for receiving and sensing a horizontal electromagnetic field contained of the secondary resulting field, while simultaneously nulling the primary electromagnetic field.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention consists of an airborne electromagnetic survey system, which includes a transmitting assembly for conducting geological surveying, and is designed to be towed by an airborne vehicle. Preferably, the vehicle is a helicopter, but those having ordinary skill in the art will appreciate that other vehicles, such as vertical take-off and landing aircraft, could also be used. The transmitting assembly is separate from the airborne vehicle but is attached thereto by suitable connection means.

The present invention comprises a rigid frame or loop structure, and is composed of straight or curved loop segments constructed of suitable material, on which, or inside which, is mounted one or more large wire coils for a transmitter, one or more wire loops for a vertical field receiver coil, and one or more helical wire coils for horizontal field receiver coils.

Figure 1:
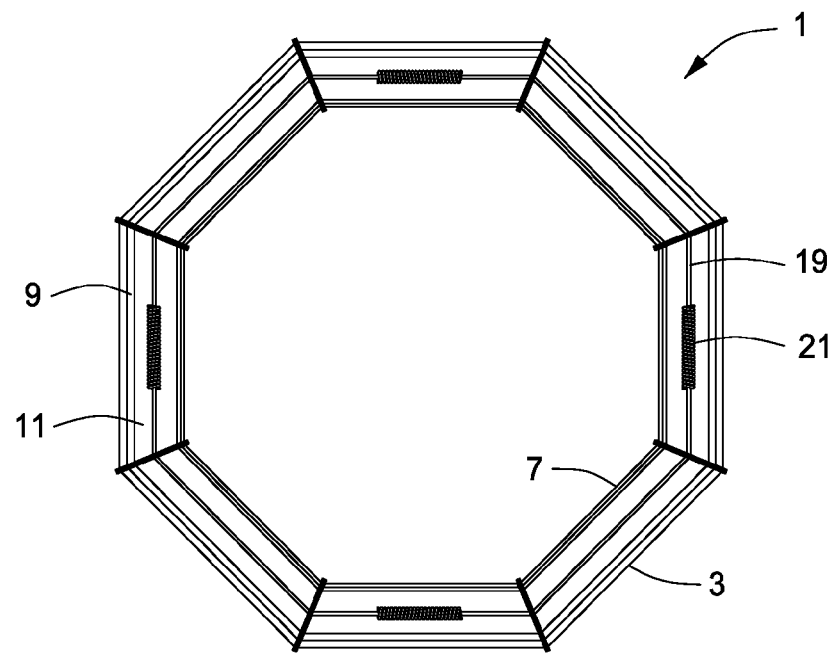
FIG. 1 is a top plan view of an embodiment of a loop structure for use in accordance with an embodiment of the present invention.
Figure 2:
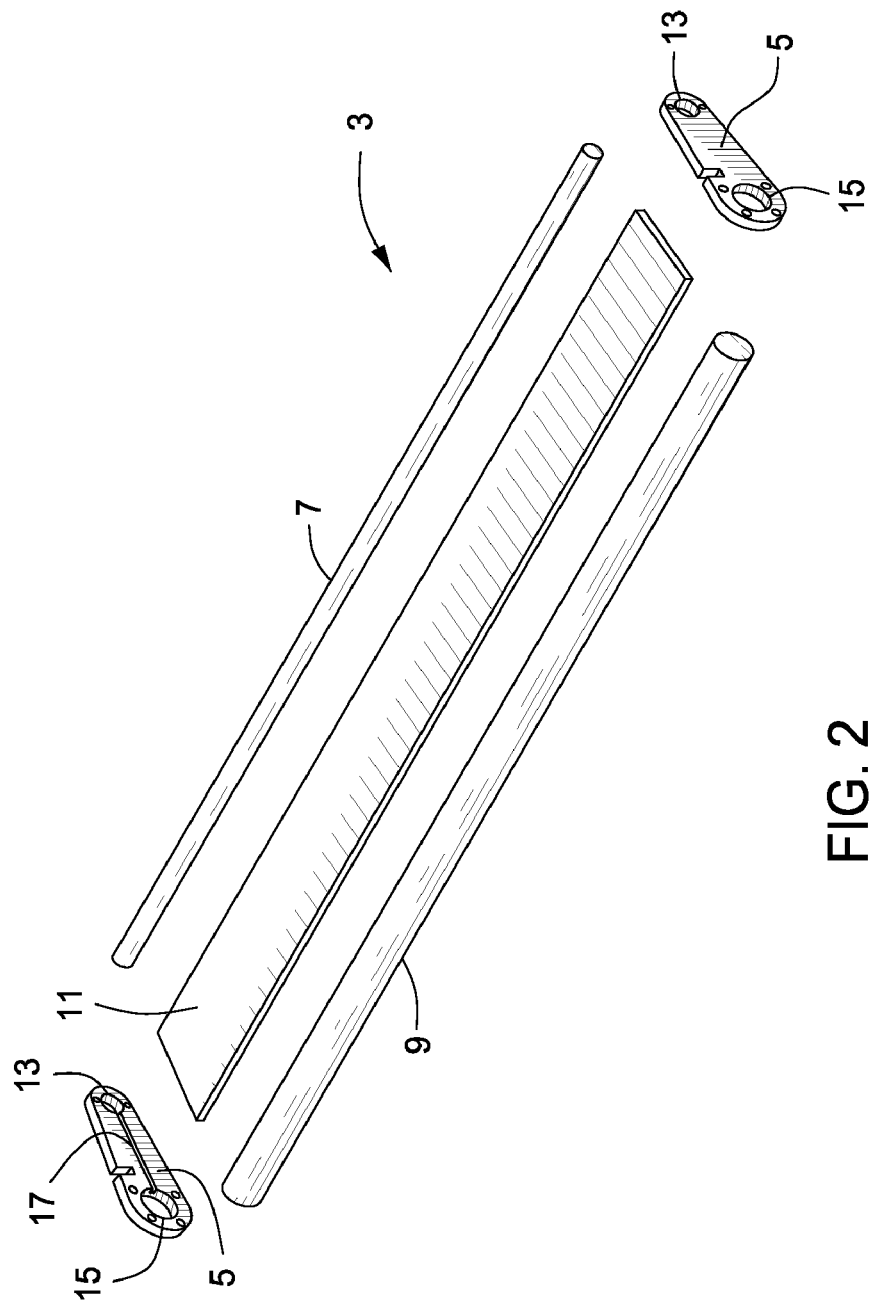
FIG. 2 is a top perspective view of one of the loop sections which comprise the loop structure of FIG. 1, in disassembled form.

The rigid loop structure 1, is formed of a plurality of interconnected and longitudinally extending loop sections 3, as can be seen with reference to FIGS. 1 and 2. In FIG. 2, in a preferred embodiment, it can be seen that each loop section 3 comprises two flange plates 5, an outer tube 9, an inner tube 7 and a shear plate 11. The shear plate 11 acts to significantly improve the structural integrity of each loop section, without significant weight increase, and the composite flanges are bonded to the tubes 7,9 and shear plate 11, in such a way as to provide a rigid structure. In the preferred embodiment of the present invention, the flange plates 5 are made of composite construction, and the tubes 7,9 are made of a rolled composite construction specifically designed to provide maximal longitudinal strength. Preferably, the outer tube 9 is the same size or larger than the inner tube 7. The shear plate 11 can be solid in construction or, in a preferred embodiment, comprise a plurality of perforations which extend throughout the surface thereof to reduce the weight of the shear plate 11 and aerodynamic lift and drag.

In constructing each loop section 3, the outer tube 9 is connected to an outside surface of the shear plate 11 and the inner tube 7 is connected to an inside surface of the shear plate 11. Flange plates 5 are then positioned over respective end portions of each of the shear plate 11, the inner tube 7 and the outer tube 9.

Each flange plate 5 has a first tube receiving opening 15 (for receiving the outer tube 9) and a second tube receiving opening 13 (for receiving the inner tube 7) therein, as well as a plate receiving slot 17. First tube receiving opening 15 and second tube receiving opening 13 extend through the entire surface of the flange plate 5. The composite flange plates, when affixed to these end portions, provide a rigid structure to the loop structure 1, which rigid structure is not easily susceptible to vibration noise, even when towed behind a vehicle.

Preferably, each of the components comprising each loop section 3 are rigidly bonded together.

The loop structure 1, as noted previously, is formed by interconnecting an appropriate number of such loop sections 3, each adjacent loop section being, preferably, bolted together so as to form the rigid loop structure 1. The loop sections 3 which comprise the loop structure may be disassembled and re-assembled as desired.

When the loop sections are interconnected to form the loop structure 1, the underlying rigid structure so formed supports both a transmitter and multiple-axis, null-coupled receiver coils, as hereinafter described.

In forming the loop structure 1, the flange plates 5 of each loop section are bonded to the loop structure at an angle to form the desired shape of the loop structure. In a preferred embodiment, when the loop structure 1 is formed by interconnecting an appropriate number of loop sections, the loop structure reflects the shape of a closed polygon of predetermined size and shape. Those having ordinary skill in this art will appreciate that the size and shape of the loop structure 1 may be modified, as appropriate for the particular application, both in size, curvature (or lack thereof), and number of segments. Preferably, the interconnected loop sections 3 which comprise the loop structure 1 define a structure having a 30 m diameter.

The loop structure 1 supports a single or multi-turn transmitter wire, for transmitting a primary electromagnetic (EM) field. The transmitter wire 19 can be installed on the loop structure, as can be seen with reference to FIGS. 1 and 3. Alternatively, the transmitter wire 19 can be installed inside the outer tube 9 or the inner tube 7. The current in the transmitter wire 19 may be driven by bipolar current sources resembling either a half-sine or a trapezoidal waveform.

In a preferred embodiment, the transmitter electronics will be housed in a compartment (not shown) attached to any one (or more) of the loop sections that comprise the loop structure 1. The optimal waveform can thus be adjusted by changing components in the transmitter electronics. The transmitter electronics are preferably designed to be modular, so as to facilitate the easier changing of components to optimize the characteristics of the transmitter electronics for the waveforms used.

Figure 3:
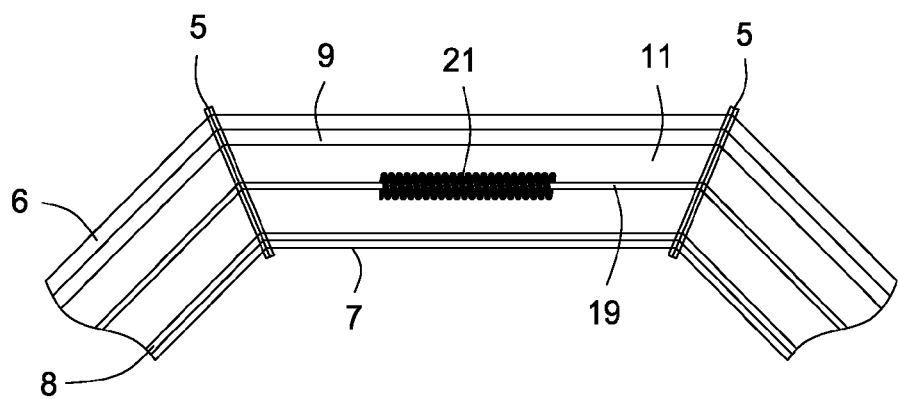
FIG. 3 illustrates a directional helical coil for use on the loop section of FIG. 2, the loop section being shown in a partial cut-away view.

With respect to the present invention, and with reference to FIG. 3, one or more inner receiver wires 8 composed of one or more turns is attached to the inner tube 7 (or inside the inner tube) of the loop structure 1, the inner receiver wire 8 sensing vertical electromagnetic fields contained in the secondary field. In the embodiment depicted in FIG. 3, the inner receiver wires are positioned on the inner tube. Alternatively, the inner receiver wire 8 could be positioned on the shear plate 11 of the loop structure 1. Preferably, the inner receiver wire 8 is disposed inside the circumference of the transmitter wire 19, and is positioned in parallel relationship thereto.

One or more outer receiver wires 6 composed of one or more turns, and which is also sensitive to vertical electromagnetic fields contained in the secondary field, is attached to the outer tube 9 (or inside the outer tube). In the embodiment depicted in FIG. 3, the outer receiver wires 6 are positioned on the outer tube 9. Alternatively, the outer receiver wire 6 could be positioned on the shear plate 11 of the loop structure 1. Preferably, the outer receiver wire 6 is disposed outside the circumference of the transmitter wire 19 and is positioned in parallel relationship thereto.

In a preferred embodiment, the configuration, including the radius of the inner receiver wire 8 and the configuration, including the radius of the outer receiver wire 6 are disposed such that the voltage induced in the inner receiver wire 8 by the electromagnetic field of the transmitter wire 19 is equal and opposite to the voltage induced in the outer receiver wire 6 by the electromagnetic field of the transmitter wire 19.

In a first embodiment of the present invention, the inner 8 and the outer receiver wires 6 are connected together at one end of the loop structure and outer loop structure, so as to form a single receiver loop component in one direction with the radius of the inner wire, and in the other direction with the radius of the outer wire, the respective radii being configured such that the signal of the primary field of the transmitter is nulled, but still measures the vertical component of the secondary electromagnetic field signal from the earth which is proportional to the difference of the area of the inner and outer receiver wires.

In another embodiment, the signals from both the inner 8 and the outer receiver wires 6 are measured simultaneously to sense in each a different strength of a vertical component of the secondary electromagnetic field, while also measuring simultaneously equal and opposite strengths of the primary field emitted from the transmitter. In effecting this measurement, the secondary field received from the earth is measured as the difference of the signal measured in the two receiver wires, which is proportional to the difference in area of the two receiver wires, and the difference of the signals from the primary field from the transmitter will be zero. In a still further embodiment, a difference therebetween is determined electronically.

With reference to FIG. 3, a directional helical coil 21 is attached to a loop section of the loop structure, the directional helical coil being sensitive to a horizontal component of the electromagnetic field. The directional helical coil 21 is shown wrapped around the transmitter wire 19, although the directional helical coil 21 could be positioned immediately adjacent to or beside the transmitter wire. In either position, wrapped around the transmitter wire or adjacent to the transmitter wire, the helical coil is placed in such a manner as to enter no signal from the primary electromagnetic field of the transmitter when the loop structure is flat. In other words, the helical coils are situated to be null-coupled to the primary electromagnetic field.

Helical coils may also be connected in pairs, or in multiple sections, in such a way as to cancel the primary field when the transmitter loop distorts in flight, emphasizing the signal of interest in either the X component (axis horizontal, in direction of flight), Y component (axis horizontal, perpendicular to direction of flight), or any horizontal component, that may be desired.

A directional helical coil 21 could be installed on any loop section of the loop structure 1, or on every loop section. In a further embodiment, multiple helical coils can be installed on any loop section, such that they measure the electromagnetic field in the same direction, or, if desired, in opposite directions.

In a still further embodiment, directional helical coils could be connected in pairs, or in series, in such a way as to cancel the primary field and to sense a horizontal component of the electromagnetic field.

In this manner receiver coils of any required geometric component can be created, including, but not limited to, sensing an X component (axis horizontal, in direction of flight) by positioning one or more directional helical coils on each side of the loop structure, and sensing a Y-component (axis horizontal, perpendicular to flight) by positioning one or more directional helical coils on the front and rear of the loop structure. In this manner, the directional helical coils can be connected so as to cancel the primary field and enhance the response of conductors in the underlying terrain. Such directional helical coils would also cancel out the response of the transmitted primary electromagnetic field, irrespective of whether the transmitter coil framework is flat or distorted. Thus, in the present invention the helical coils and the receiver wires together form a three-component set of sensors (X, Y and Z).

In a preferred embodiment, a single cable from the airborne vehicle is connected to multiple cables that are attached to the inventive structure at multiple points around the circumference of the loop structure. Preferably, these cables are connected to each flange plate around the loop structure, though it will also be understood that these cables can be attached elsewhere on the loop structure so as to evenly distribute the weight thereabout.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

The invention claimed is:

1. A rigid transmitter loop structure for use in an airborne electromagnetic surveying system and designed for connection to a towing airborne vehicle, the transmitter loop structure comprising:
    a plurality of interconnected loop segments adapted to be constructed to form a rigid closed loop;
    transmitting means fitted to at least one of the interconnected loop segments for generating and transmitting an earthbound primary electromagnetic field effective for geological surveying;
    sensing means fitted to at least one of the interconnected loop segments for receiving and sensing a vertical component of a secondary resulting electromagnetic field, the secondary resulting field arising from an interaction of the primary electromagnetic field with ground bodies that are traversed by the sensing means, while simultaneously nulling the primary electromagnetic field; and
    helical sensing means positioned in close proximity to the transmitting means, for receiving and sensing a horizontal electromagnetic field contained in the secondary resulting field, while simultaneously nulling the primary electromagnetic field.

2. The loop structure of claim 1, wherein each of the plurality of interconnected loop segments comprise:
    a center portion;
    a first container connected to an outside surface of the center portion;
    a second container connected to an inside surface of the center portion; and
    a pair of flange plates, the flange plates each being secured to respective end portions of the center portion and the first and the second container.

3. The loop structure of claim 2, wherein the first container and the second container are substantially hollow.

4. The loop structure of claim 3, wherein the first container and the second container are tubular.

5. The loop structure of claim 3, wherein the first container and the second container are formed of rolled composite materials.

6. The loop structure of claim 2, wherein the first container is a same size as the second container.

7. The loop structure of claim 2, wherein the first container is larger than the second container.

8. The loop structure of claim 1, wherein the transmitter loop structure is attached to the towing airborne vehicle by a tow rope assembly comprising a plurality of tow ropes which are each attached to spaced apart areas on the transmitter loop structure.

9. The loop structure of claim 1, wherein the towing airborne vehicle is a helicopter.

10. The loop structure of claim 1, wherein the towing airborne vehicle is an aircraft.

11. The loop structure of claim 2, wherein the first container and the second container are bonded to the center portion.

12. The loop structure of claim 2, wherein the flange plates are bonded to each interconnected loop segment.

13. The loop structure of claim 12, wherein the flange plates each further comprise a first receiving opening for receiving the first container therein, a second tube receiving opening for receiving the second container therein, and a receiving slot for receiving the center portion therein.

14. The loop structure of claim 2, wherein the loop segments are interconnected by bolting the flange plates of each adjoining loop segment together.

15. The loop structure of claim 1, wherein the loop segments which comprise the loop structure can be disassembled and re-assembled.

16. The loop structure of claim 1, wherein the plurality of interconnected loop segments define a polygonal profile.

17. The loop structure of claim 1, wherein the transmitting means comprises one or more transmitter wire coils.

18. The loop structure of claim 2, wherein the sensing means is fitted to extend around a surface of the interconnected loop segments.

19. The loop structure of claim 18, wherein the sensing means comprises at least one inner receiver wire and at least one outer receiver wire.

20. The loop structure of claim 19, wherein the at least one inner receiver wire is positioned parallel to and inside a circumference of the transmitting means.

21. The loop structure of claim 19, wherein the at least one outer receiver wire is positioned parallel to and outside a circumference of the transmitting means.

22. The loop structure of claim 19, wherein the at least one inner receiver wire is positioned inside the second container.

23. The loop structure of claim 19, wherein the at least one outer receiver wire is positioned inside the first container.

24. The loop structure of claim 19, wherein the at least one inner receiver wire and the at least one outer receiver wire are connected together to form a single receiver, the single receiver enabling the nulling the primary electromagnetic field.

25. The loop structure of claim 1, wherein the helical sensing means is positioned adjacent to the transmitting means.

26. The loop structure of claim 1, wherein the helical sensing means is wound around the transmitting means.

27. The loop structure of claim 1, wherein the helical sensing means comprise one or more helical receiver wire coils.

28. The loop structure of claim 19, wherein a radius of the at least one inner receiver wire and a radius of the at least one outer receiver wire are such that a voltage induced in the at least one inner receiver wire by the primary electromagnetic field emitted by the transmitting means is equal and opposite to a voltage induced in the at least one outer receiver wire.

29. The loop structure of claim 28, wherein the at least one inner receiver wire is connected at one end to the at least one outer receiver wire, such that the secondary resulting electromagnetic field measured is a difference of the secondary resulting electromagnetic field measured in the two receiver wires.

30. The loop structure of claim 28, wherein the secondary resulting electromagnetic field measured by the at least one inner receiver wire and the secondary resulting electromagnetic field measured by the at least one outer receiver wire are measured separately, and then a difference therebetween is determined electronically.

31. The loop structure of claim 27, wherein the helical sensing means comprises a plurality of helical receiver wire coils, connected in series, so as to null the primary electromagnetic field and emphasize a signal of interest.

32. The loop structure of claim 31, wherein the signal of interest is an x component, a y component or another horizontal component of the electromagnetic field.

33. A rigid transmitter loop structure for use in an airborne electromagnetic surveying system and designed for connection to a towing airborne vehicle, the transmitter loop structure comprising:
   a plurality of interconnected loop segments adapted to be constructed to form a rigid closed loop, each of the interconnected loop segments comprising a center portion, a first container connected to an outside surface of the center portion, a second container connected to an inside surface of the center portion, and a pair of flange plates, the flange plates each being secured to respective end portions of the center portion and the first and the second container;
   transmitting means fitted to at least one of the interconnected loop segments for generating and transmitting an earthbound primary electromagnetic field effective for geological surveying;
   sensing means fitted to at least one of the interconnected loop segments for receiving and sensing a vertical component of a secondary resulting electromagnetic field, the secondary resulting field arising from an interaction of the primary electromagnetic field with ground bodies that are traversed by the sensing means, while simultaneously nulling the primary electromagnetic field; and
   helical sensing means positioned in close proximity to the transmitting means, for receiving and sensing a horizontal electromagnetic field contained in the secondary resulting field, while simultaneously nulling the primary electromagnetic field.

34. An airborne electromagnetic survey system for attachment to a towing airborne vehicle, the system comprising:
   a transmitter loop structure, the loop structure comprising a plurality of interconnected loop segments adapted to be constructed to form a rigid closed loop, each having a center portion, a first container connected to an outside surface of the center portion, a second container connected to an inside surface of the center portion, and a pair of flange plates, the flange plates each being secured to respective end portions of the center portion and the first and the second container;
   transmitting means fitted to at least one of the interconnected loop segments for generating and transmitting an earthbound primary electromagnetic field effective for geological surveying;
   sensing means fitted to the interconnected loop segments for receiving and sensing a vertical component of a secondary resulting electromagnetic field, the secondary resulting field arising from an interaction of the primary electromagnetic field with ground bodies that are traversed by the sensing means, while simultaneously nulling the primary electromagnetic field; and
   helical sensing means positioned in close proximity to the transmitting means, for receiving and sensing a horizontal electromagnetic field contained of the secondary resulting field, while simultaneously nulling the primary electromagnetic field.

* * * * *